United States Patent [19]

Woodward

[11] Patent Number: 5,465,883
[45] Date of Patent: Nov. 14, 1995

[54] WINDSHIELD CARRIER RACK FOR THE REAR END OF A PICKUP TRUCK

[76] Inventor: Jerry A. Woodward, 338 N. 100 East, Orem, Utah 84057

[21] Appl. No.: 201,166

[22] Filed: Feb. 22, 1994

[51] Int. Cl.[6] .................................................. B60R 9/06
[52] U.S. Cl. .......................... 224/495; 224/531; 224/524; 224/537; 224/558; 224/571; 224/402; 224/403; 224/405; 211/41
[58] Field of Search .................... 224/277, 42.03 R, 224/42.03 A, 42.04, 42.07, 42.08, 42.43, 42.45 R; 211/41; 296/3

[56] References Cited

U.S. PATENT DOCUMENTS

| | | | |
|---|---|---|---|
| 2,947,565 | 8/1960 | Wood | 296/3 |
| 4,033,597 | 7/1977 | Boyer | 211/41 X |
| 4,232,806 | 11/1980 | Shald | 224/42.07 |
| 4,234,112 | 11/1980 | Gallant | 224/42.43 |
| 4,360,298 | 11/1982 | Fischer et al. | 296/3 X |
| 4,640,658 | 2/1987 | Webb, Jr. | 224/42.08 X |
| 4,646,952 | 3/1987 | Timmers . | |
| 4,744,590 | 5/1988 | Chesney | 224/42.08 X |
| 4,778,064 | 10/1988 | Gold | 211/41 |
| 4,915,276 | 4/1990 | Devito | 224/42.43 |
| 4,989,768 | 2/1991 | McNulty | 224/42.45 R |
| 5,000,363 | 3/1991 | Linquist | 224/42.43 |

OTHER PUBLICATIONS

Catalog Sheets from C. R. Laurence Co., Inc., undated, pp. 124 & 126.

*Primary Examiner*—J. Casimer Jacyna
*Attorney, Agent, or Firm*—Mallinckrodt & Mallinckrodt

[57] ABSTRACT

A carrier rack device for delivering replacement windshields for automotive vehicles, panels of flat glass, or other types of panels outside of and to the rear of an automotive vehicle, such as a conventional pickup truck, is constructed to be cantilevered from attachment to the rear of the vehicle. In one form of the invention, the device attaches to the usual trailer hitch of the vehicle. In another form, the device attaches directly to the tailgate of a truck, usually a conventional pickup truck. In both forms, a pair of laterally spaced, elongate carrier parts extend from securement to the rear of the vehicle so as to extend longitudinally rearwardly for receiving therebetween the panels to be carried in-conventional receiving pockets. One form is more versatile than the other in its provision of separate carrier parts, each having mounting structure components that telescope in selectively different ways into attachment with other mounting structure to serve different purposes.

17 Claims, 3 Drawing Sheets

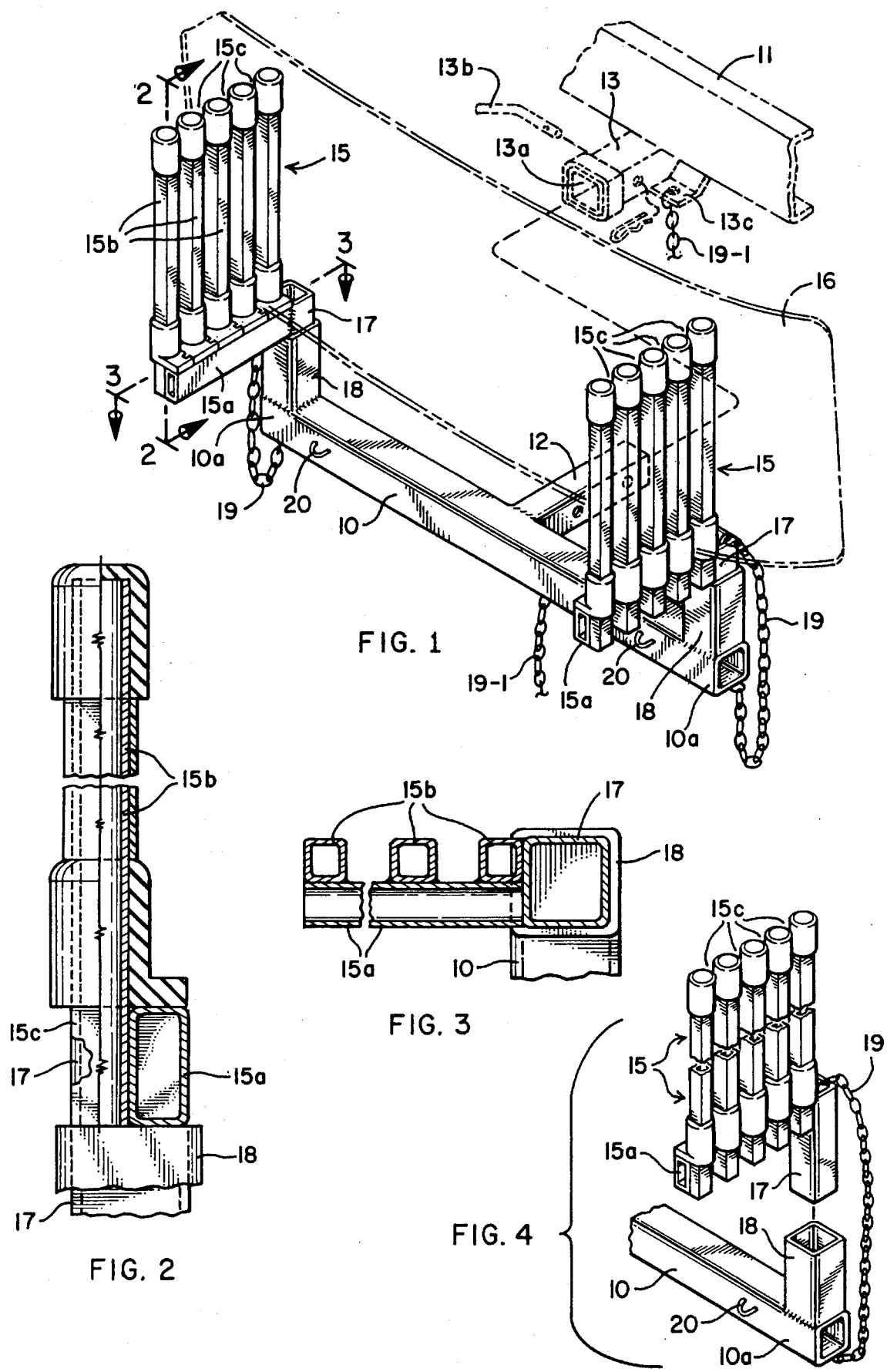

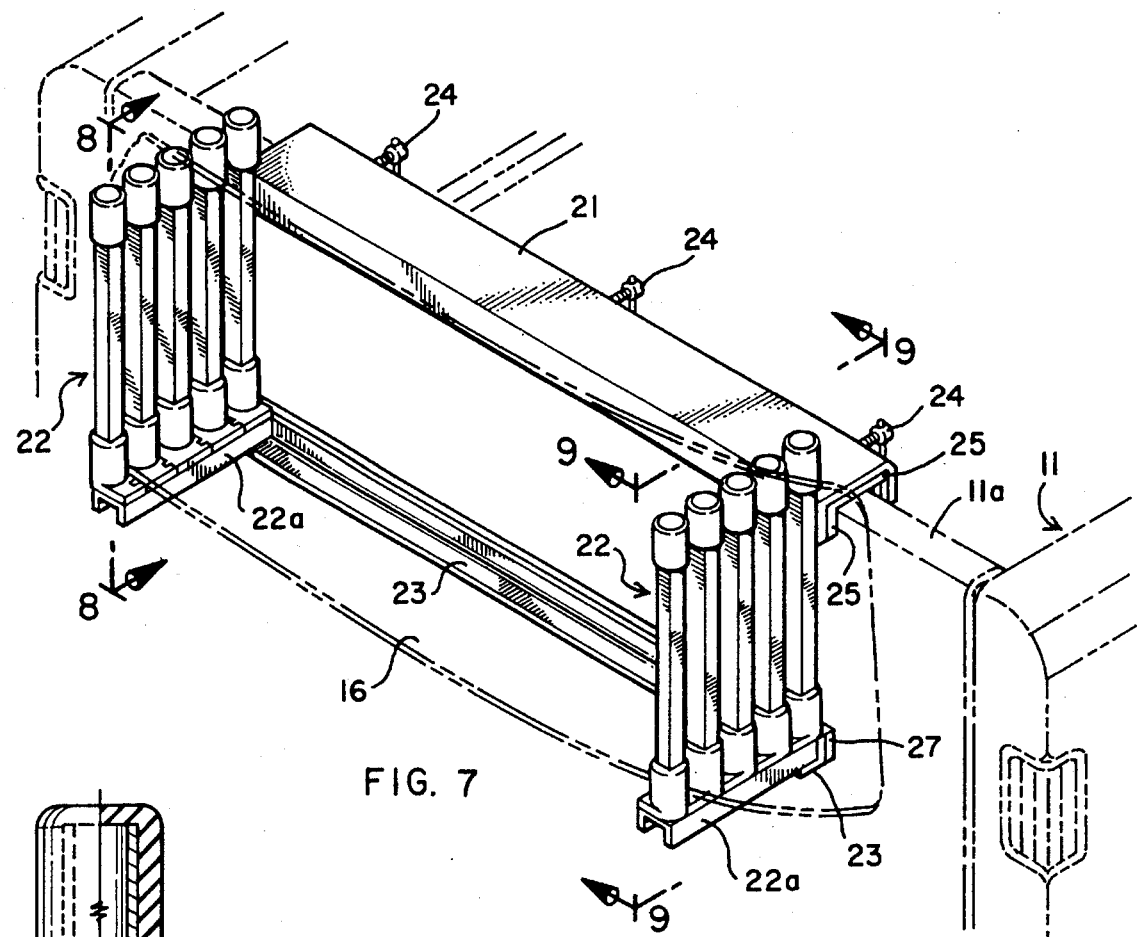
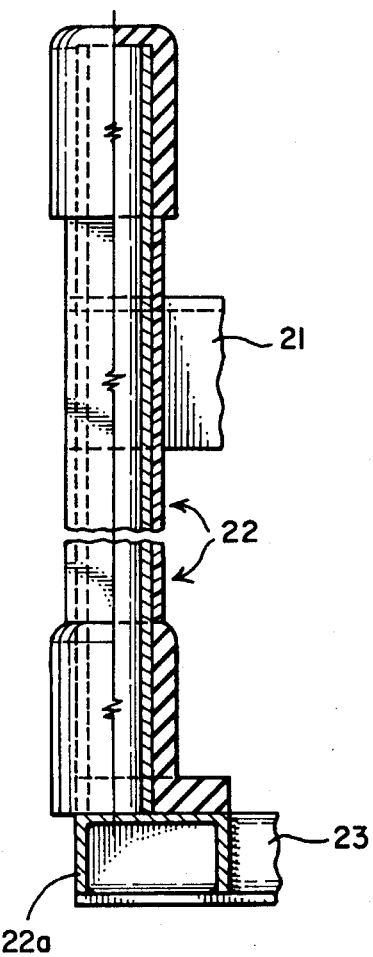
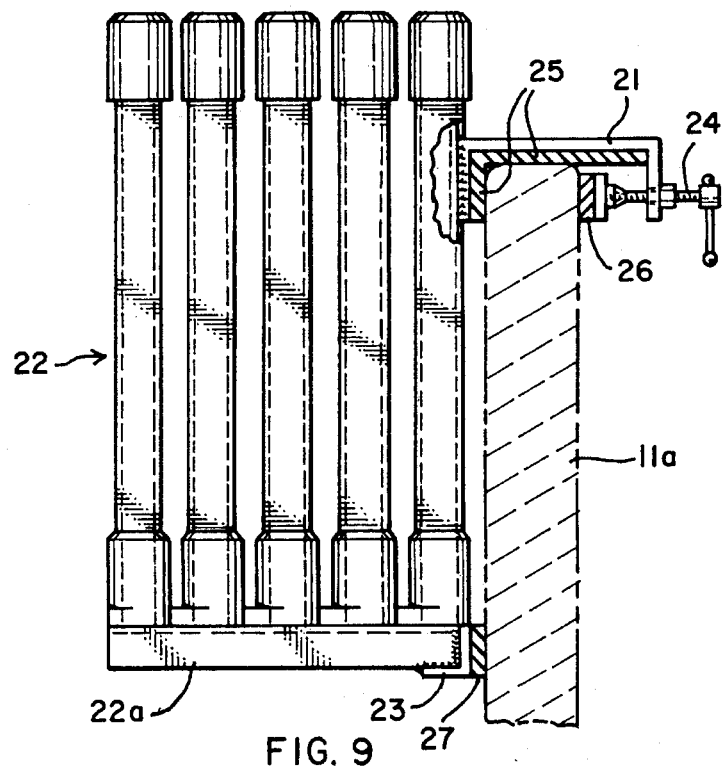
FIG. 7
FIG. 8
FIG. 9

5,465,883

WINDSHIELD CARRIER RACK FOR THE REAR END OF A PICKUP TRUCK

BACKGROUND OF THE INVENTION

1. Field

The invention is in the field of carrier racks for transporting automobile windshields or flat glass panels from place to place by pickup truck, a common practice in the glass industry.

2. State of the Art

Carrier racks for safely transporting automobile windshields or flat glass panels from place-to-place by those persons in the business of selling replacement windshields for automobiles and flat panels of glass are in common use as constructed for carrying a number of such windshields or glass panels within the beds of standard pickup trucks, typically for delivering such windshields or glass panels from supplier to installer.

Although it is broadly old to attach a carrier to a trailer hitch so such carrier extends rearwardly from the back end of an automotive vehicle, see Timmers U.S. Pat. No. 4,646,952 of Mar. 3, 1987, such disclosure has nothing to do with the carrying of replacement windshields, glass panels, or other panels, such as plywood, used for various building and other purposes to which the rack device of the present invention is applicable.

SUMMARY OF THE INVENTION

I have recognized that carrying replacement windshields or flat glass panels for delivery purposes at the rear of a truck outside the truck bed would be advantageous not only from the standpoint of leaving the bed of the truck free for carrying other bulkier and heavier items but to make it easier to load and unload the carrier part of the rack device with the modern curved and somewhat clumsy replacement windshields to be delivered to customers.

Accordingly, the present invention provides a carrier rack device that fastens securely to the rear end of an automotive vehicle, normally a truck and usually a standard pickup truck outside the bed of the truck, with the windshield or flat glass receiving carrier part thereof cantilevered from such rear end of the vehicle, the entire device being quickly and easily mountable and demountable as required and the carrier part normally extending to the rear of the vehicle free of surrounding structure.

Basically, the carrier rack device of the invention comprises the combination of vehicle mounting structure and a pair of elongate carrier parts constructed to cantilever rearwardly from the vehicle in laterally mutually spaced relationship.

Of the possible embodiments of the invention, one provides for attachment of the rack device to the trailer hitch that is typically provided at the rear of a pickup truck, such rack device being versatile in the positioning of the carrier parts thereof either for use, for transport empty, or for quick and easy placement so the carrier parts do not interfere with opening and closing of the tailgate of the truck. This comprises a tubular construction providing for telescoping of tubular mounting components into selected positions that place the carrier part of the rack device as desired. A second embodiment comprises mounting components adapted to attach directly to the tailgate of a pickup truck so that the carrier parts of the device extend rearwardly therefrom free and clear of surrounding structure, the entire rack device being easily mounted on the tailgate when needed and removable therefrom when it becomes desirable to open the tailgate.

THE DRAWINGS

In the drawings, which illustrate both of the afore-mentioned embodiments of carrier rack device as the best modes of carrying out the invention in actual practice:

FIG. 1 is a pictorial view of the one embodiment of carrier rack device of the invention constructed for attachment to the usual trailer hitch of a pickup truck with the carrier parts of the rack device in carrying positions, a windshield being indicated in phantom by dotted lines in one set of pockets of laterally spaced longitudinal sets of same in respective carrier parts of the rack device and with the rear end and trailer hitch of the truck being indicated fragmentarily in phantom by broken lines;

FIG. 2, a view in rear elevation and partly in vertical section taken along the line 2—2 of FIG. 1 and drawn to a larger scale;

FIG. 3, a horizontal section taken along the line 3—3 of FIG. 1, with parts in the background being shown fragmentarily in elevation, the view being drawn to the larger scale of FIG. 2;

FIG. 4, an exploded, fragmentary, pictorial view showing how the carrier parts of the rack device telescope into the carrying positions of FIG. 1;

FIG. 5, a pictorial view corresponding to that of FIG. 1 but showing the carrier parts in different positions for carrying different kinds of items, a portion of the mounting structure being broken out for convenience of illustration;

FIG. 6, a composite view in rear elevation showing how the separable carrier parts of the carrying rack device can be variously telescoped into selected other positions for transportation as unloaded;

FIG. 7, a view corresponding to that of FIG. 1 but showing the aforementioned second embodiment of the invention in which the mounting components are adapted to attach directly to the tailgate of a truck, no windshield being shown;

FIG. 8, a view corresponding to that of FIG. 2 but showing the embodiment of FIG. 7; and FIG. 9, a transverse section partly in elevation taken on the line 9—9 of FIG. 7 and drawn to a larger scale than FIG. 7 but to a somewhat smaller scale than FIG. 8.

DETAILED DESCRIPTION OF THE ILLUSTRATED EMBODIMENTS

Figure 5:
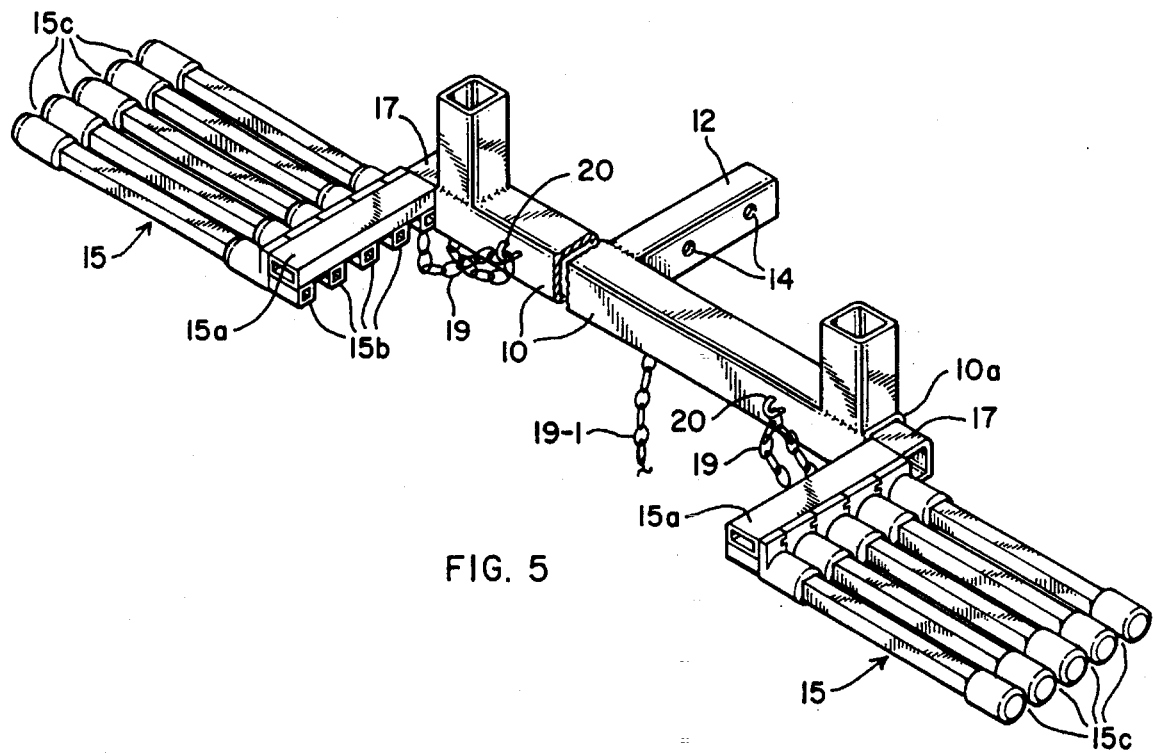
Figure 6:
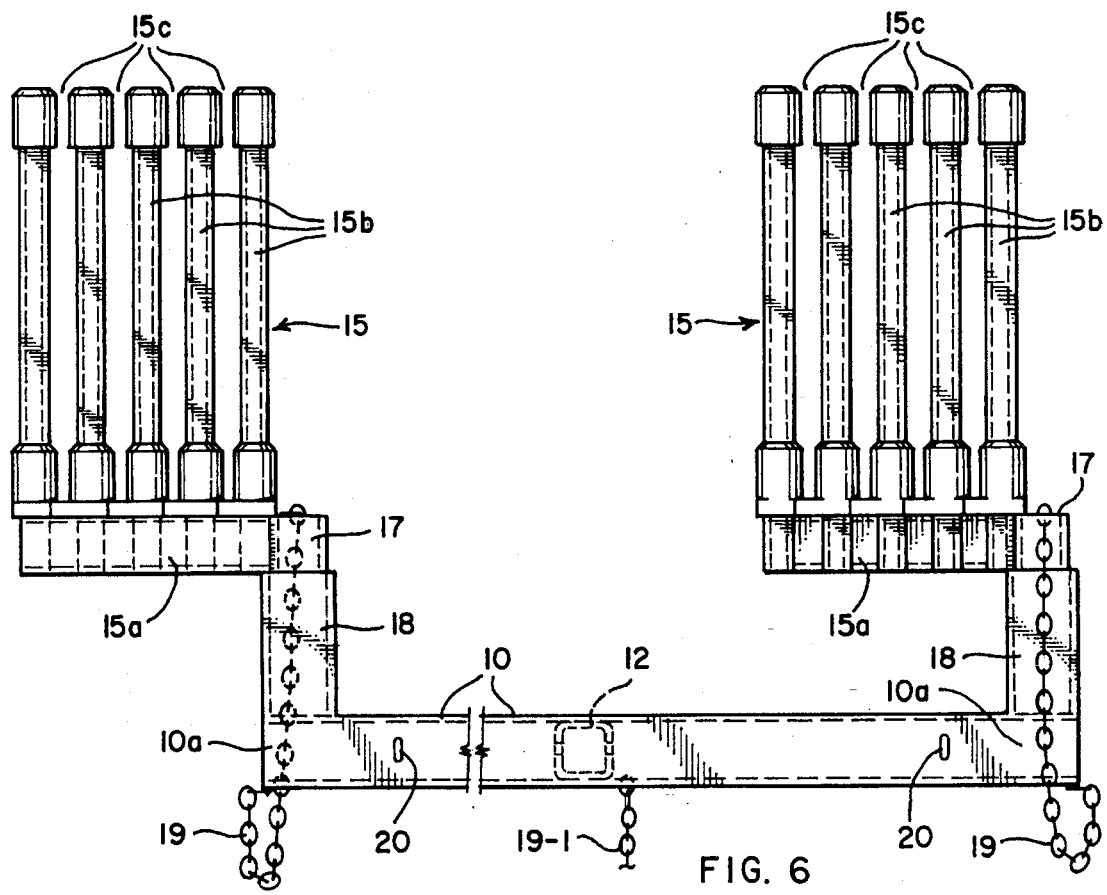

Both of the illustrated embodiments of the invention comprise the combination of mounting structure adapted for quick and easy attachment to the rear end of an automotive vehicle so as to extend transversely of such rear end, and a pair of elongate carrier parts constructed to extend longitudinally rearwardly of the vehicle in transversely mutually spaced relationship, the carrier parts providing respective longitudinal series of elongate pockets that are upstanding, as is usual, for receiving and securely holding a corresponding series of the items to be carried. As illustrated, associated items not part of the invention as such are shown in phantom by broken lines.

In the embodiment of FIGS. 1–6, which is highly versatile and particularly advantageous for use with a standard pickup truck having a tailgate and equipped with a trailer hitch, the carrier parts of the rack device each includes a part of the mounting structure which telescopically connects with other parts of the mounting structure that are adapted to be fastened to the trailer hitch of the pickup truck, which part of the mounting structure is capable of assuming various positions selected for the carrying of windshields, flat glass, or other items of general panel formation or for other carrying or different but useful purposes, such as for transportation of the device from place to place in unloaded condition or to enable the tailgate of the truck to be opened even though the carrier parts of the device are connected to the truck.

As illustrated, the mounting structure of this embodiment comprises a rectilinear length 10 of steel mechanical tubing that is square in transverse cross section and has its opposite ends 10a open, the length of such length of tubing normally being less than the width of the rear end of the bed 11 of the particular pickup truck to which it will be attached and the dimensions of its cross section desirably being two-and-a-half inches by two-and-a-half inches. Secured to such length 10 of tubing intermediate its ends 10a and usually midway-of its length, as by welding, is a stub length 12 of preferably the same type of tubing for fitting into the receiving socket 13a, FIG. 1, of the trailer hitch 13 of the truck. Stub length 12 extends normal, that is to say perpendicularly, from tubing length 10 and preferably has a length in itself providing for longitudinal adjustability within trailer hitch 13 by providing several holes 14, FIG. 5, along its length for insertion of locking pin 13b and associated safety insert 11c of such trailer hitch, thereby providing more or less room between the carrier rack device and the end of the truck.

A pair of elongate carrier parts 15, each including a bar member 15a as a base, to and along which a series of pegs 15b, cushioned as usual, have one end secured, as by welding, to base bar 15a and are upstanding therefrom in the working position of such carrier as a windshield or flat glass panel receiving rack device, to provide a corresponding series of cushioned pockets 15c open at their tops for receiving panels, such as windshield 16, respectively, see FIG. 1. Unique in each carrier part 15 is the provision of mounting structure in the form of members 17 here shown as lengths of mechanical steel tubing, respectively, that are short relative to tubing length 10 but smaller in cross section so as to telescope therein, and that extend from carrier parts 15 in a direction opposite to that of the extension of the pockets 15c thereof but in approximately the same plane therewith.

The mounting structure also includes a pair of lengths 18, respectively, of tubing similar to that of length 10 but that are relatively short compared to the tubing length 10, that have one set of ends secured, as by welding, to opposite end portions, respectively, of tubing length 10, that have the other ends open and free, and that extend from tubing length 10 normal thereto and at right angles to the plane thereof and of its stub length 12, so as to be upstanding when such tubing length 10 is installed in trailer hitch 13 of the truck.

In installing carrier parts 15 (see FIG. 4) to provide a carrier rack as shown in FIG. 1, the mounting members 17 thereof are telescoped into tubular mounting structure lengths 18 so that the elongate series of pockets 15c extend longitudinally backwardly of the truck. In these positions of carrier parts 15, a windshield 16 or an elongate table top (not shown) may be laid on top of the cushioned pegs 15b when the truck is stopped for use as a work table. However, versatility is provided for by the fact that mounting structure members 17 can be inserted differently in the lengths 18, respectively, as shown by either the left hand portion or the right hand portion of FIG. 6. In either instance, the carrier parts 15 can be transported and used to carry very narrow items in the pockets 15c.

Additional versatility is provided for by the fact that mounting structure members 17 can be inserted differently in the open ends, respectively, of length 10 so that, for example, the series of pegs 15b extend horizontally, as in FIG. 5, to leave the tailgate of the pickup truck free for opening and closing and with the carrier parts 15 available along the sides of the open tailgate on which objects can be rested during loading and unloading of the truck bed or on which boxes or other objects can be tied down for transport. Also, whenever desired, carrier parts 15 can be turned downwardly and the correspondingly turned mounting structure members 17 inserted in the open ends of length 10 to hang vertically downwardly (not shown) for transport and even to serve as mud flaps for the rear wheels of the truck if desired.

It is advantageous that, for each carrier part 15, a safety securement chain 19 be secured, as by welding, at one of its ends to such carrier part and at its other end to the corresponding end 10a of length 10 as illustrated. Respective hooks 20 may be provided on length 10 for hanging chain slack, as shown in FIG. 5. Again, a safety chain 19-1 for the trailer hitch connection may be provided, one end being secured to length 10 and the other end secured to a part 13c of trailer hitch 13.

In the aforementioned second embodiment of the invention as illustrated in FIGS. 7–9, wherein the mounting structure is adapted to connect with the tailgate of a truck, such mounting structure comprises an elongate structural channel 21 to opposite ends of which are secured, as by welding, a pair of carrier parts 22, respectively. Such channel 21 is positioned with its open channel recess facing downwardly so as to receive and fit over the upper marginal edge portion of the tailgate 11a of the pickup truck 11. Spaced below channel 21, preferably in parallel therewith, is a correspondingly elongate structural angle 23 having its open angle recess facing away from channel 21 and receiving corresponding inboard ends of a pair of mounting members 22a of carrier parts 22, respectively, that project outwardly in cantilever fashion from securement, as by welding, to structural angle 23 within the angle recess thereof. Such mounting members 22a are, advantageously from the standpoint of strength and rigidity, structural steel channels, respectively, with their channel recesses facing downwardly as illustrated. The last one of the cushioned pegs 22b of each carrier part 22 has its interior post secured, as by welding, to the confronting structural channel 21. Thus, in this embodiment, the carrier parts 22 of the pair are not separate from those component structural mounting members 21 and 22 that directly connect with tailgate 11a of the truck. However, less desirably as presently contemplated, the pair of carrier parts 22 could be separate and each provided with its own relatively short structural mounting member corresponding to structural channel 21 with its own and relatively short structural mounting member corresponding to structural angle 23, for connection to opposite end portions of the tailgate of the truck.

Means are provided for securing structural channel 21 to the received upper marginal edge portion of tailgate 11a. Such means as here shown are manually operated clamps 24 spaced along the length of channel 21 as shown in FIGS. 7 and 9.

To protect the truck tailgate from being marred during installation and transportation, the channel recess of channel 21 is lined with cushioning material 25. Similarly, the clamping faces of clamps 24 are covered by cushioning pads 26, and the outer face of structural angle 23 that confronts the tailgate is covered by an elongate cushioning pad 27.

It should be realized that although steel tubing and structural steel shapes have been indicated herein as the best material presently contemplated for use in the construction of the carrier rack device of the invention, other materials such as aluminum and various plastics may be found suitable and used within the purview of the invention.

Whereas this invention is here illustrated and described with reference to embodiments thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A carrier rack device for automotive windshields, comprising mounting structure adapted for quick and easy attachment to and removal from the rear end of an automotive vehicle so as to extend transversely of said rear end; and a pair of mutually independent, elongate carrier parts constructed to extend longitudinally rearwardly of said vehicle from attachment only at their forward ends to said mounting structure in mutually spaced relationship transversely of said rear end of the automotive vehicle and individually cantilevered from said mounting structure, said carrier parts as so attached providing respective elongate series of upstanding pockets for receiving and securely holding a corresponding series of upstanding automotive windshields to be carried, said series of pockets each extending longitudinally of the corresponding elongate carrier part.

2. A carrier rack device according to claim 1, wherein the mounting structure comprises structural channel means for fitting over and receiving the upper marginal edge portion of the tailgate of an automotive truck, carrier support means in parallel with and spaced from said channel means, the carrier parts being secured to said channel means and extending between said channel means and said carrier support means and cantilevered therefrom normal thereto; and manually operated means for securing said channel means to said tailgate of the truck and for releasing said channel means from said tailgate of the truck.

3. A carrier rack device according to claim 2, wherein cushioning means lines the channel recess of the structural channel means and the faces of the carrier support means and of the securement means that confront the tailgate of the automotive truck in the installed positions of the carrier rack devices.

4. A carrier rack device according to claim 2, wherein the structural channel means is an elongate structural channel and wherein the carrier support mean is a similarly elongate structural angle, both extending from lateral end to lateral end of the carrier rack device.

5. A carrier rack device according to claim 1, wherein the carrier parts are provided at their forward ends for selective attachment differentially to respective end portions of the mounting structure at opposite sides of but rearwardly of the automotive vehicle so the carrier parts and their series of pockets as attached may also extend in varying arrangements relative to each other and to the automotive vehicle.

6. A carrier rack device according to claim 5, wherein the mounting structure is a length of structural tubing having opposite ends adapted to telescopically receive forwardly placed ends of said carrier parts; and wherein the telescoped ends of said mounting structure and said carrier parts are provided with means for preventing relative rotation thereof.

7. A carrier rack device according to claim 6, wherein said mounting device is provided with relative short, upstanding, tubular lengths at opposite end portions thereof providing additional telescopic attachments, respectively, for said ends of the carrier parts.

8. A carrier rack device according to claim 6, wherein the mounting structure is provided intermediate its length with a relatively short tube length extending perpendicularly therefrom and adapted for telescopic connection with the trailer hitch of an automotive vehicle.

9. A carrier rack device for automotive windshields or other items of generally panel formation, comprising mounting structure adapted for quick and easy attachment to and removal from the rear end of an automotive vehicle so as to extend transversely of said rear end; and a pair of elongate carrier parts constructed to extend rearwardly of said vehicle from attachment to said mounting structure in mutually spaced relationship transversely of said rear end of the automotive vehicle, said carrier parts providing respective elongate series of pockets that may be upstanding as installed for receiving and securely holding a corresponding series of panel items to be carried, said series of pockets each extending longitudinally of the corresponding elongate carrier part, wherein the mounting structure comprises lengths of tubular structural material polygonal in transverse cross section, one of said lengths having open ends and carrying, intermediate its length and extending therefrom normal thereto, a stub member for fitting into a trailer hitch attached to the rear end of the automotive vehicle so said one length extends transversely of the rear end of said vehicle when installed; and said mounting structure also comprising a pair of lengths, each being relatively short compared to said one length, being smaller in cross section than said one length so as to telescope into an end of said one length, and being attached at one end to an end portion of one of the elongate carrier parts and extending therefrom normal thereto in a direction opposite to that of the extension of the pockets thereof but in approximately the same plane therewith.

10. A carrier rack device according to claim 9, wherein the basic mounting structure also comprises a pair of lengths that are each relatively short compared to the one length but of the same cross section, and that are secured at one set of ends thereof to opposite end portions, respectively, of said one length, with the other end open and free, and that extend therefrom normal thereto and at right angles to the plane of the one length and its stub member so as to be upstanding upon installation of the carrier rack and capable of telescopically receiving the lengths, respectively, that are attached to the carrier parts, so that the pockets of said carrier parts are upstanding as installed for use as a carrier.

11. A carrier rack device according to claim 10, wherein securement chains are provided at opposite ends of the one length, each chain having one end secured to the corresponding end of the one length and the other end secured to the free end portion of the corresponding length of the pair of lengths that are secured to opposite ends, respectively, of said one length.

12. A carrier rack device according to claim 9, wherein the one of the lengths of tubular structural material is square in transverse cross section.

13. A carrier rack device for automotive windshields or other items of generally panel formation, comprising mounting structure adapted for quick and easy attachment to and removal from the rear end of an automotive pickup truck having a tailgate and a trailer hitch below said tail gate at the rear end of said truck; and a pair of elongate carrier parts adapted to extend rearwardly of the rear end of said truck from attachment to said mounting structure in mutually spaced relationship transversely of said rear end of said truck; said mounting structure comprising a first length of tubular structural material that is polygonal in transverse cross section and has secured thereto intermediate its length a stub member projecting therefrom normal thereto and adapted to telescope into said trailer hitch, opposite ends of said first length being open, said mounting structure also including a pair of similar but relatively short lengths having a set of corresponding ends secured to opposite end portions, respectively, of said first length and projecting therefrom normal thereto and perpendicular to the plane of said stub member with the opposite set of ends open, and a second pair of similar relatively short lengths attached to said carrier parts, respectively, and having transverse cross sections smaller than those of said first length and of said first pair of lengths so as to telescopically fit into the open ends of said first length and of said first pair of lengths, said second pair of lengths extending from said carrier parts normal thereto in a direction opposite that of the extension of the pockets thereof but in approximately the same plane therewith.

14. A carrier rack device according to claim 13, wherein the first length of tubular structural material is square in cross section.

15. A carrier rack device for automotive windshields, comprising mounting structure adapted for quick and easy attachment to a vehicle; and a pair of elongate, substantially coextensive carrier parts, each having an elongate base member and an elongate rack formed by an elongate series of elongate pegs attached at corresponding ends thereof to and along said base member, forward ends of said carrier parts being secured to said mounting structure so that said series of pegs extends longitudinally along and substantially perpendicularly from said base member providing a corresponding series of pockets between adjoining pegs, respectively, for receiving said automotive windshields, solely forward ends of said carrier parts being secured to said mounting structure, with said carrier parts being cantilevered therefrom, said base member of each carrier part having an end adapted to attach to and in telescopic relationship with an end portion of said mounting structure; and means for preventing relative rotation of said base member and said mounting structure when attached together in telescopic relationship.

16. A carrier rack device for automotive windshields or other items of generally panel formation according to claim 15, wherein the means for preventing relative rotation of the parts when attached together in telescopic relationship is the tubular formation of said parts being polygonal in transverse cross section.

17. A carrier rack device for automotive windshields or other items of generally panel formation according to claim 16, wherein the tubular formation of the parts is square in transverse cross section.

* * * * *